(12) United States Patent
Takeuchi (10) Patent No.: US 11,978,914 B2
(45) Date of Patent: May 7, 2024

(54) BATTERY PACK CASING WITH INSULATING PLATFORM

(71) Applicant: KAWASAKI MOTORS, LTD., Akashi (JP)

(72) Inventor: Hiroshi Takeuchi, Kakogawa (JP)

(73) Assignee: KAWASAKI MOTORS, LTD., Akashi (JP)

( * ) Notice: Subject to any disclaimer, the term of this patent is extended or adjusted under 35 U.S.C. 154(b) by 299 days.

(21) Appl. No.: 16/998,167

(22) Filed: Aug. 20, 2020

(65) Prior Publication Data

US 2021/0104713 A1 Apr. 8, 2021

(30) Foreign Application Priority Data

Oct. 7, 2019 (JP) .................... 2019-184477

(51) Int. Cl.
| | | |
|---|---|---|
| *H01M 10/00* | (2006.01) | |
| *H01M 10/42* | (2006.01) | |
| *H01M 50/20* | (2021.01) | |
| *H01M 50/249* | (2021.01) | |
| *H01M 50/298* | (2021.01) | |

(Continued)

(52) U.S. Cl.
CPC ......... *H01M 50/20* (2021.01); *H01M 10/425* (2013.01); *H01M 50/249* (2021.01); *H01M 50/298* (2021.01); *H01M 50/502* (2021.01); *H01M 50/531* (2021.01); *H01M 50/204* (2021.01); *H01M 50/296* (2021.01); *H01M 2220/20* (2013.01)

(58) Field of Classification Search
CPC .. H01M 50/20; H01M 10/425; H01M 50/502; H01M 50/531; H01M 2220/20; H01M 10/48; H01M 50/298; H01M 50/50; H01M 50/574; H01M 50/213; H01M 50/296; H01M 50/583; H01M 2010/4271; H01M 2200/103; H01M 50/249; H01M 50/204; Y02E 60/10

See application file for complete search history.

(56) References Cited

U.S. PATENT DOCUMENTS

| | | | | |
|---|---|---|---|---|
| 9,529,033 B2* | 12/2016 | Inoue | ................. | B60L 3/04 |
| 2006/0246350 A1* | 11/2006 | Takayama | ............. | H01M 50/50 |
| | | | | 429/178 |

(Continued)

FOREIGN PATENT DOCUMENTS

JP 2015077887 A 4/2015

*Primary Examiner* — Nicholas P D'Aniello
(74) *Attorney, Agent, or Firm* — Alleman Hall & Tuttle LLP (57) ABSTRACT

An internal unit includes: a battery cell group including a plurality of battery cells; a holder holding the battery cell group; and a platform connected to the holder. The platform includes: an insulating major surface on which a positive electrode member and a negative electrode member are disposed adjacent to each other, the positive electrode member including a positive electrode-side circuit member or a terminal of a positive electrode-side electronic component, the negative electrode member including a negative electrode-side circuit member or a terminal of a negative electrode-side electronic component; and an insulating partition portion projecting from the major surface and separating the positive electrode member and the negative electrode member from each other.

18 Claims, 8 Drawing Sheets

(51) Int. Cl.
*H01M 50/502* (2021.01)
*H01M 50/531* (2021.01)
*H01M 50/204* (2021.01)
*H01M 50/296* (2021.01)

(56) References Cited

U.S. PATENT DOCUMENTS

| | | | | |
|---|---|---|---|---|
| 2012/0034507 A1* | 2/2012 | Harada | ............... | H01M 10/625 |
| | | | | 429/120 |
| 2013/0105129 A1* | 5/2013 | Youngs | ................... | B60L 58/26 |
| | | | | 165/168 |
| 2013/0130071 A1* | 5/2013 | Adachi | ................ | H01M 50/20 |
| | | | | 429/61 |
| 2015/0072193 A1* | 3/2015 | Balk | .................... | B60L 3/0046 |
| | | | | 429/82 |
| 2015/0151740 A1* | 6/2015 | Hynes | ................... | B60L 58/12 |
| | | | | 701/29.2 |

* cited by examiner

BATTERY PACK CASING WITH INSULATING PLATFORM

CROSS-REFERENCE TO RELATED APPLICATION

This application claims priority to and the benefit of Japanese Patent Application No. 2019-184477, filed on Oct. 7, 2019, the entire disclosure of which is incorporated herein by reference.

BACKGROUND

Technical Field

An aspect of the present disclosure relates to a battery pack.

Description of the Related Art

Japanese Laid-Open Patent Application Publication No. 2015-77887 discloses a motorcycle configured as a hybrid vehicle equipped with a battery. The battery stores electric power to be supplied to a motor for travel in the electric vehicle (EV) mode.

Such a battery and electronic components related to the battery are desirably compact in size in order to ensure a sufficient space for arrangement of other devices. If a compact battery pack is constructed, components on the positive electrode side could be located close to components on the negative electrode side. It is often the case that the components are secured by means of fasteners made of metal. In view of the possibility that any of the fasteners might be detached and fall off, measures need to be taken to prevent a detached fastener from causing short-circuit between the components on the positive electrode side and the components on the negative electrode side. A possible approach to prevent the short-circuit is to provide a protective component having insulating properties; however, this approach involves an increase in the number of required components.

SUMMARY

A battery pack according to one aspect of the present disclosure includes a casing and an internal unit accommodated in the casing, wherein the internal unit includes: a battery cell group including a plurality of battery cells; a holder holding the battery cell group; a platform connected to the holder; a plurality of electronic components mounted on the platform; a plurality of circuit members mounted on the platform; and at least one fastener made of metal and securing at least one of the electronic components and the circuit members, the electronic components include a positive electrode-side electronic component electrically connected to a positive electrode side of the battery cell group and a negative electrode-side electronic component electrically connected to a negative electrode side of the battery cell group, the circuit members include a positive electrode-side circuit member electrically connected to the positive electrode side of the battery cell group and a negative electrode-side circuit member electrically connected to the negative electrode side of the battery cell group, and the platform includes: an insulating major surface on which a positive electrode member and a negative electrode member are disposed adjacent to each other, the positive electrode member including the positive electrode-side circuit member or a terminal of the positive electrode-side electronic component, the negative electrode member including the negative electrode-side circuit member or a terminal of the negative electrode-side electronic component; and an insulating partition portion projecting from the major surface and separating the positive electrode member and the negative electrode member from each other.

In the above configuration, where the electronic components and the circuit members are closely arranged, the partition portion of the platform can, in the event of detachment and falling off of the fastener made of metal, prevent the detached fastener from causing short-circuit between the positive electrode member and the negative electrode member. Thus, while the battery pack is constructed in a compact form, short-circuit between the positive electrode member and the negative electrode member on the platform can be prevented without having to increase the number of required components.

DETAILED DESCRIPTION OF THE EMBODIMENTS

Hereinafter, an embodiment will be described with reference to the drawings.

Figure 1:
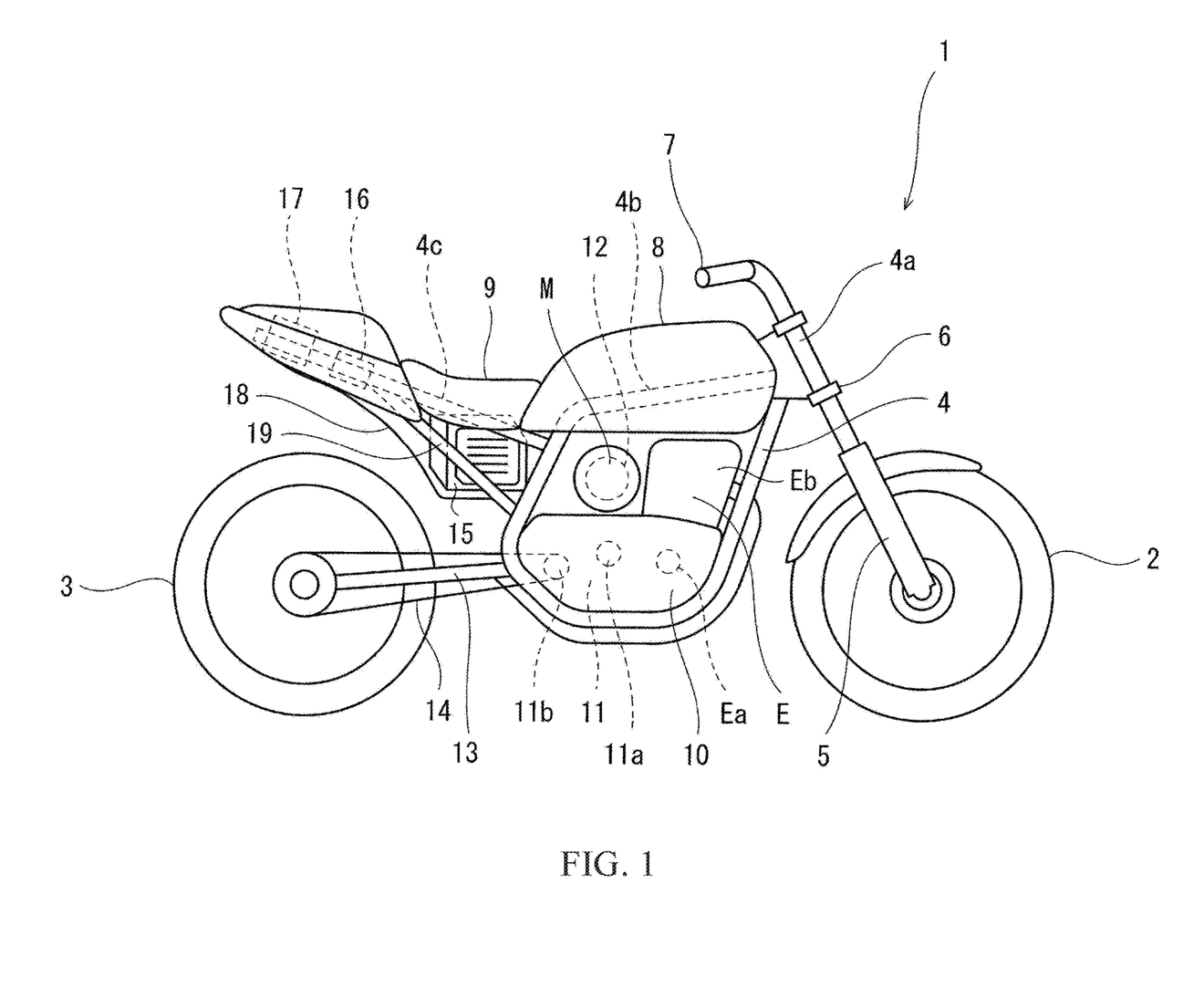
FIG. 1 is a side view of a motorcycle according to an embodiment.

FIG. 1 is a side view of a motorcycle 1 according to the embodiment. In FIG. 1, the motorcycle 1 is shown as an example of vehicles and configured as a hybrid vehicle. The motorcycle 1 includes a front wheel 2 (driven wheel), a rear wheel 3 (drive wheel), a vehicle body frame 4, a front suspension 5 connecting the front wheel 2 to a front portion of the vehicle body frame 4, and a rear suspension (not illustrated) connecting the rear wheel 3 to a rear portion of the vehicle body frame 4. The front suspension 5 is connected to a bracket 6, and a steering shaft (not illustrated) connected to a handle 7 is connected to the bracket 6. The steering shaft is supported by a head pipe 4a so as to be angularly movable. The head pipe 4a constitutes a part of the vehicle body frame 4.

The vehicle body frame 4 includes a main frame 4b extending rearward from the head pipe 4a, a seat support frame 4c extending rearward from an upper rear portion of the main frame 4b, and an auxiliary frame 4d extending from a lower portion of the main frame 4b to a middle portion of the seat support frame 4c and supporting the seat support frame 4c from below. A fuel tank 8 is disposed rearward of the handle 7, and a seat 9 on which the rider sits is disposed rearward of the fuel tank 8. The seat 9 is supported by the seat support frame 4c. On the main frame 4b is mounted an engine E serving as a power source for travel. The engine E is located between the front and rear wheels 2 and 3. An electric motor M serving as a power source for travel is disposed in the vicinity of the engine E.

The engine E includes a cylinder Eb, and a crankcase 10 extends rearward from a lower portion of the cylinder Eb. The electric motor M provided for driving the drive wheel and configured to generate drive power to be transmitted to the drive wheel is disposed rearward of the cylinder Eb of the engine E and above the crankcase 10. The electric motor M is supported by the main frame 4b via the crankcase 10. An inverter 12 is mounted integrally with the electric motor M. The inverter 12 may be disposed away from the electric motor M.

Inside the crankcase 10 is disposed a transmission 11 including an input shaft 11a and an output shaft 11b. The input shaft 11a receives power transmitted from a crankshaft Ea of the engine E through gears and a main clutch (not illustrated). The input shaft 11a of the transmission 11 receives power transmitted from the electric motor M through a non-illustrated power transmission mechanism. That is, both power of the engine E and power of the electric motor M are transmitted to the input shaft 11a. The motorcycle 1 is not limited to a parallel hybrid motorcycle but may be a series hybrid motorcycle. A swing arm 13 supporting the rear wheel 3 and extending in the front-rear direction is supported by the vehicle body frame 4 so as to be angularly movable. The rotational power of the output shaft 11b of the transmission 11 is transmitted to the rear wheel 3 through an output transmission member 14 (e.g., a chain or belt).

A battery pack 15 supported by the seat support frame 4c is disposed rearward of the electric motor M. In particular, the battery pack 15 is disposed under the seat 9. The fact that the battery pack 15 provided for the drive system and storing electric power to be supplied to the electric motor M is disposed under the seat 9 means that the battery pack 15 which is a heavy component is located in the vicinity of the center of gravity of the motorcycle 1. A DC-DC converter 16 supported by the seat support frame 4c is disposed rearward of the battery pack 15. The DC-DC converter 16 reduces the voltage of the electric power output from the battery pack 15.

An auxiliary battery 17 supported by the seat support frame 4c is disposed rearward of the DC-DC converter 16. The auxiliary battery 17 receives a supply of the electric power output from the battery pack 15 and subjected to voltage drop across the DC-DC converter 16. Thus, the battery pack 15 outputs high-voltage electric power for activation of the electric motor M serving as a power source for travel, while the auxiliary battery 17 outputs low-voltage electric power to be supplied to electronic components (such as an ECU).

The lower end of the battery pack 15 is located below and forward of the upper end of the rear wheel 3. A part of the battery pack 15 is located below the seat support frame 4c. The battery pack 15, DC-DC converter 16, and auxiliary battery 17 are covered from below by a rear fender 18 facing the rear wheel 3. The rear fender 18 is supported by the seat support frame 4c. A front portion of the rear fender 18 covers the rear and bottom surfaces of the battery pack 15. The battery pack 15 is disposed inward of the seat support frame 4c and the auxiliary frame 4d in the vehicle width direction. The two side surfaces (left and right surfaces) of the battery pack 15 which are opposed to each other in the vehicle width direction are exposed to an environment outside the motorcycle 1. That is, the two side surfaces of the battery pack 15 in the vehicle width direction are exposed to the outside environment in a side view of the motorcycle 1, and are subjected directly to air stream during travel.

Figure 2:
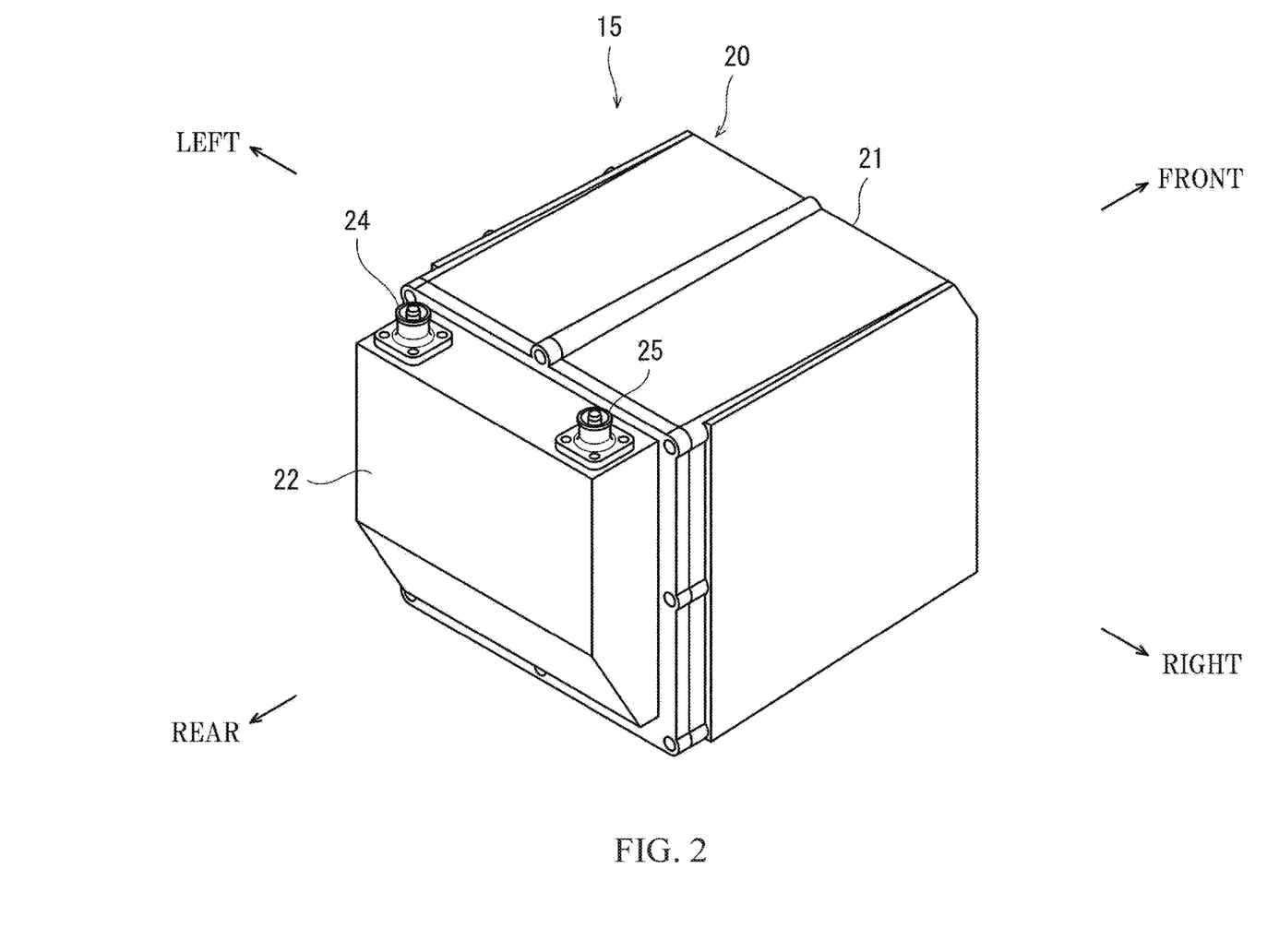
FIG. 2 is a top rear perspective view of a battery pack mounted on the motorcycle of FIG. 1.

FIG. 2 is a top rear perspective view of the battery pack 15 mounted on the motorcycle 1 of FIG. 1. The directions mentioned hereinafter are those defined based on the orientation (position) of the battery pack 15 mounted on the motorcycle 1, although the orientation of the battery pack 15 is not limited to that described below. As shown in FIG. 2, the battery pack 15 includes a casing 20 which is generally in the shape of a rectangular parallelepiped. The casing 20 includes a casing body 21 and a cover 22. The casing body 21 is in the shape of a hexahedron with the rear surface open, and a battery assembly 31 described later (see FIG. 3) is disposed in the internal space of the casing body 21.

The cover 22 covers the internal space of the casing body 21 from the rear and forms a rear wall of the casing 20. The cover 22 has a recess, and an electronic component assembly 32 described later (see FIG. 3) is disposed in the internal space of the cover 22. The cover 22 is provided with a positive electrode-side connector 23 and a negative electrode-side connector 24 which are electrically connected to an internal unit 30 described later. It is advantageous that radiating fins be provided on the left and right walls of the casing body 21.

Figure 3:
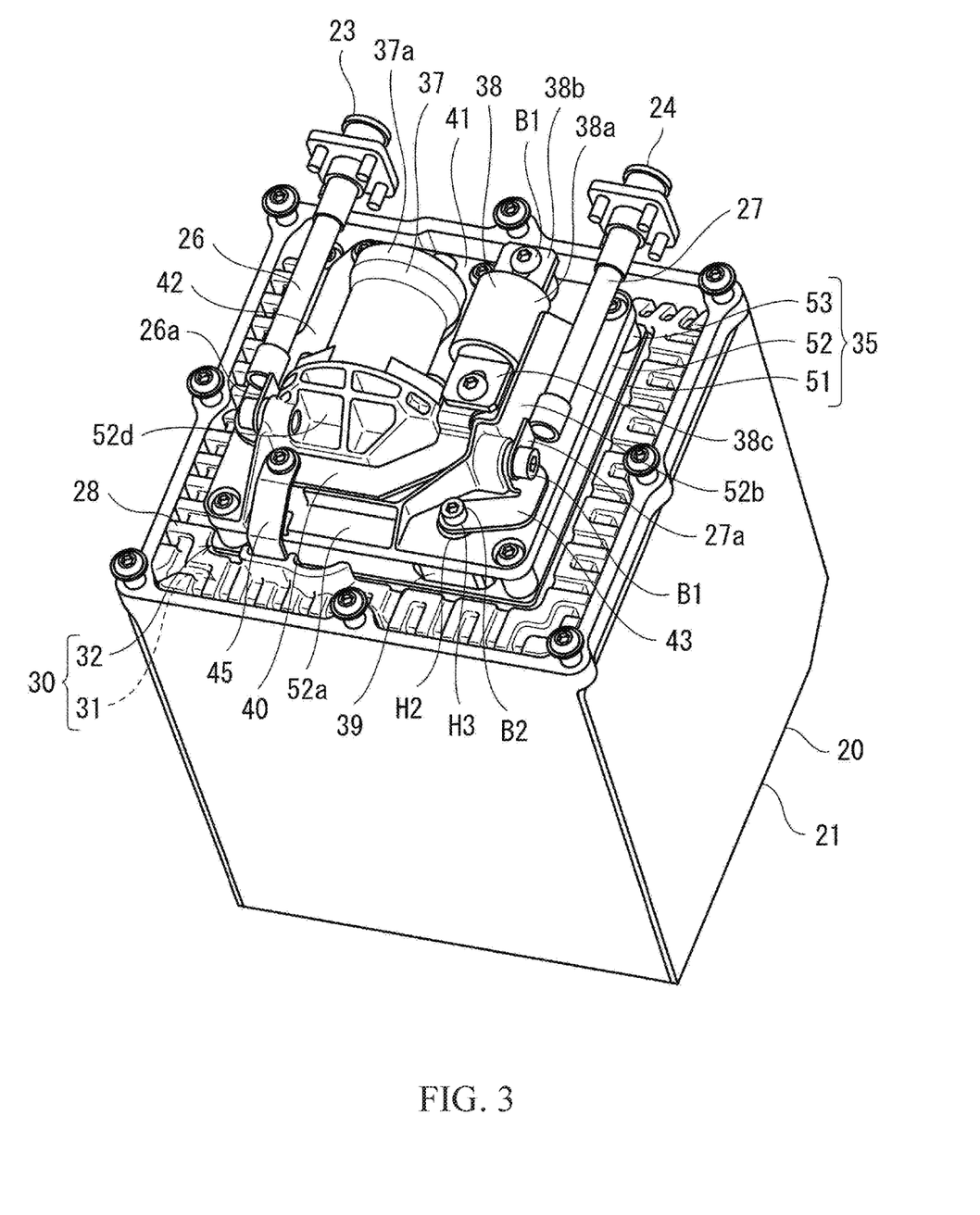
FIG. 3 is a bottom rear perspective view of the battery pack of FIG. 2 with a cover thereof removed.
Figure 4:
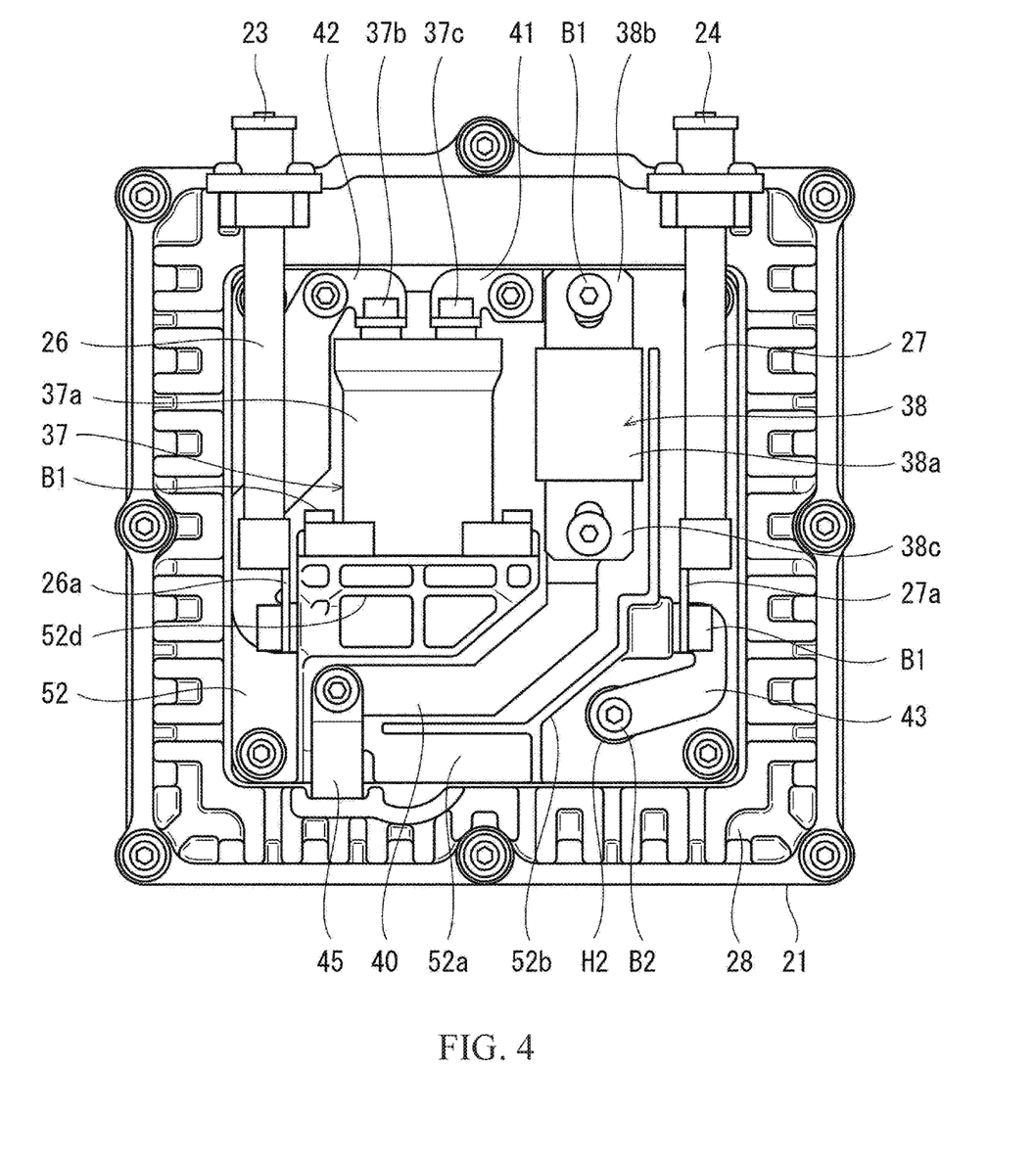
FIG. 4 is a back view of the battery pack shown in FIG. 3.
Figure 5:
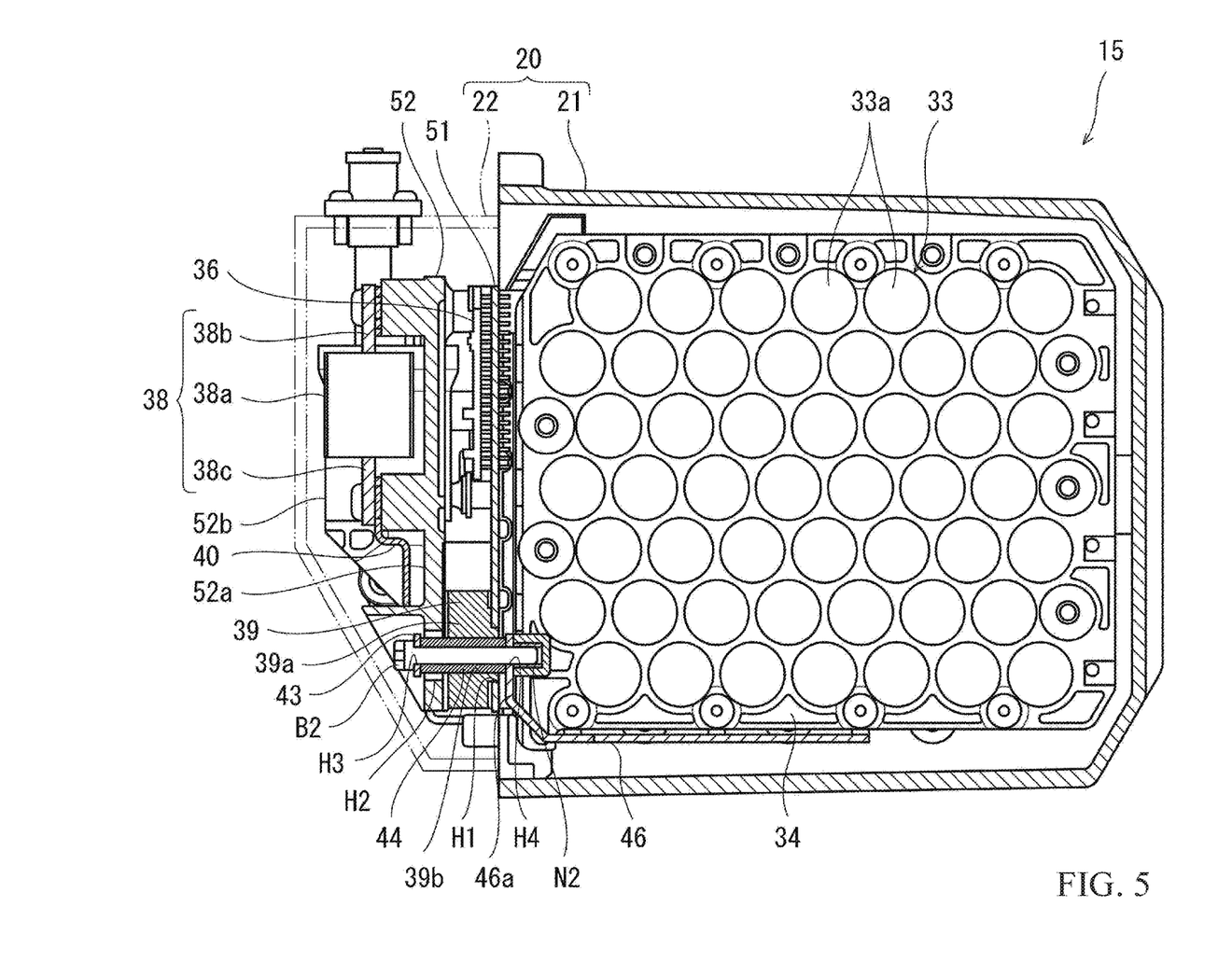
FIG. 5 is a vertical cross-sectional view of the battery pack shown in FIG. 3.
Figure 6:
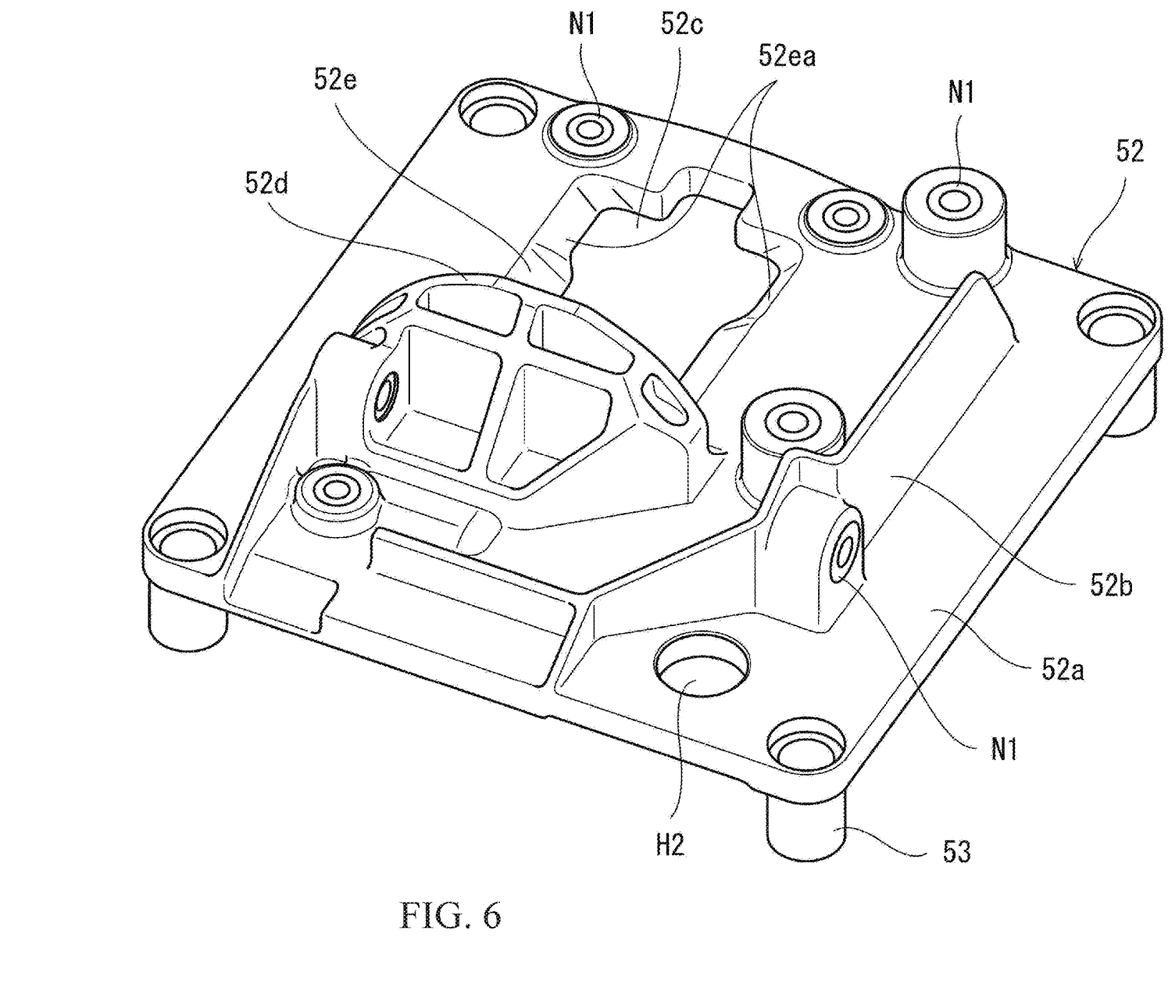
FIG. 6 is a bottom perspective view of a second plate portion and pillar portions of a platform shown in FIG. 3.
Figure 7:
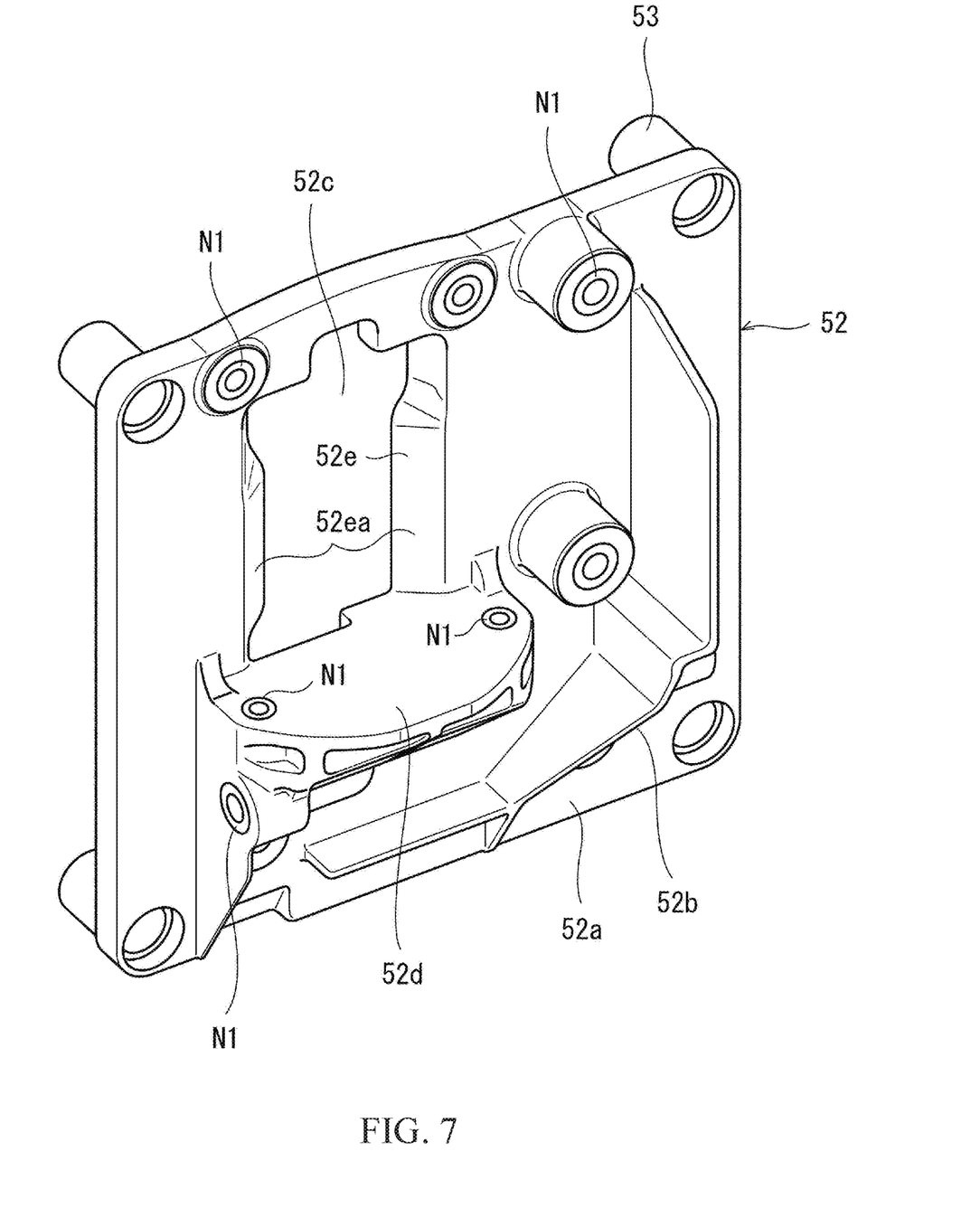
FIG. 7 is a top perspective view of the second plate portion and pillar portions of the platform shown in FIG. 4.
Figure 8:
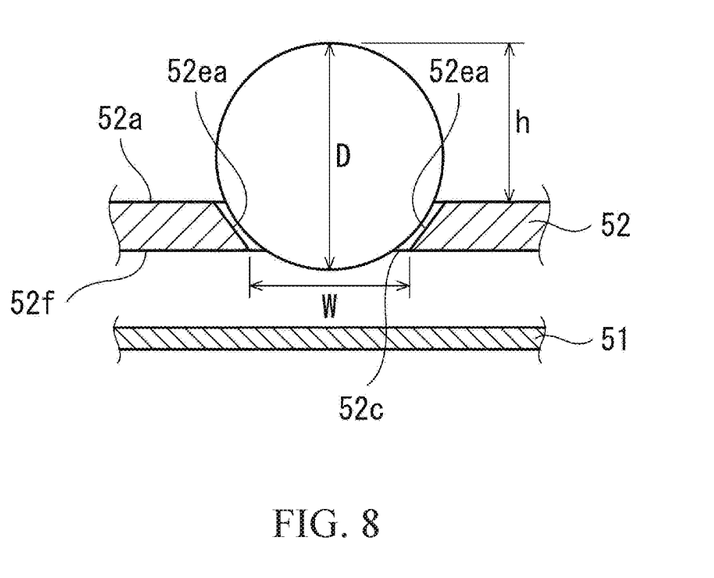
FIG. 8 is a cross-sectional view of a relay device and its vicinity in the battery pack shown in FIG. 3.

FIG. 3 is a bottom rear perspective view of the battery pack 15 of FIG. 2 with the cover 22 removed. FIG. 4 is a back view of the battery pack 15 shown in FIG. 3. FIG. 5 is a vertical cross-sectional view of the battery pack 15 shown in FIG. 3. FIG. 6 is a bottom perspective view of a second plate portion 52 and pillar portions 53 of a platform 35 shown in FIG. 3. FIG. 7 is a top perspective view of the second plate portion 52 and pillar portion 53 of the platform 35 shown in FIG. 4. FIG. 8 is a cross-sectional view of a relay device 37 and its vicinity in the battery pack 15 shown in FIG. 3.

Referring to FIGS. 3 to 5, the internal unit 30 is removably placed within the casing 20 of the battery pack 15. The internal unit 30 includes the battery assembly 31 and the electronic component assembly 32. The electronic component assembly 32 is disposed lateral to (e.g., rearward of) the battery assembly 31. Thus, an increase in the height of the internal unit 30 is prevented.

The battery assembly 31 includes a battery cell group 33 and a holder 34. The battery assembly 31 is generally in the shape of a rectangular parallelepiped. The battery cell group 33 includes a plurality of battery cells 33a. Each battery cell 33a is generally in the shape of a circular cylinder, and the battery cells 33a are arranged to form a group which is generally in the shape of a rectangular parallelepiped. The battery cells 33a are in electrical communication with one another. The holder 34 is made of an insulating resin and holds the battery cell group 33.

The electronic component assembly 32 includes a platform 35, a battery management system (BMS) 36, a relay device 37, a fuse device 38, a current sensor 39, a first positive electrode electronic component-side bus bar 40, a second positive electrode electronic component-side bus bar 41, a third positive electrode electronic component-side bus bar 42, a negative electrode electronic component-side bus bar 43, a plurality of first bolts B1 (fasteners), a second bolt B2 (fastener), a conductive collar 44, a positive electrode battery-side bus bar 45, and a negative electrode battery-side bus bar 46.

The platform 35 is a base on which the electronic components are mounted, and is connected to the holder 34. The platform 35 is made of an insulating resin. The platform 35 is placed along a side surface (e.g., the rear surface) of the battery assembly 31. The electronic components mounted on the platform 35 include the BMS 36, the relay device 37, the fuse device 38, and the current sensor 39. Further, the first positive electrode electronic component-side bus bar 40, the second positive electrode electronic component-side bus bar 41, the third positive electrode electronic component-side bus bar 42, and the negative electrode electronic component-side bus bar 43 are mounted as circuit members on the platform 35.

Specifically, the platform 35 has a two-story structure including a first plate portion 51, a second plate portion 52, and a plurality of pillar portions 53. The first plate portion 51 and the second plate portion 52 are spaced from each other and positioned parallel to each other. The first and second plate portions 51 and 52 are coupled by the plurality of pillar portions 53. The first plate portion 51 is secured to the holder 34. The first and second plate portions 51 and 52 are parallel to the rear surface of the battery assembly 31.

The BMS 36 (first electronic component) and a circuit pattern (not illustrated) connected to the BMS 36 are mounted on the outer surface (rear surface) of the first plate portion 51. The current sensor 39 (first electronic component) is mounted on the first plate portion 51 and located in the space between the first and second plate portions 51 and 52. The relay device 37 (second electronic component; positive electrode-side electronic component) and the fuse device 38 (second electronic component; positive electrode-side electronic component) are mounted on the outer surface (rear surface) of the second plate portion 52.

The relay device 37 includes a housing 37a and a pair of terminals 37b and 37c. The housing 37a encloses a relay (not illustrated). The housing 37a is generally in the shape of a circular cylinder having an outer circumferential surface, a top surface, and a bottom surface. The pair of terminals 37b and 37c are disposed on the top surface of the housing 37a. The fuse device 38 includes a housing 38a and a pair of terminals 38b and 38c. The housing 38a encloses a fuse element (not illustrated). The terminal 38b projects upward from the housing 38a and the terminal 38c projects downward from the housing 38a. The relay device 37 and fuse device 38 are arranged side by side.

The first to third positive electrode electronic component-side bus bars 40 to 42 (electronic component-side bus bars; positive electrode-side circuit members) are disposed on the outer surface (major surface) of the second plate portion 52. The first positive electrode electronic component-side bus bar 40 connects one end of the positive electrode battery-side bus bar 45 to the terminal 38c of the fuse device 38. The other end of the positive electrode battery-side bus bar 45 is electrically connected to the positive electrode side of the battery cell group 33. The second positive electrode electronic component-side bus bar 41 connects the terminal 38b of the fuse device 38 to the terminal 37c of the relay device 37. The third positive electrode electronic component-side bus bar 42 connects the terminal 37b of the relay device 37 to a terminal 26a of a positive electrode-side cable 26.

The positive electrode-side cable 26 is located at one side of the platform 35 in the left-right direction and extends along the outer surface of the second plate portion 52 in the up-down direction. The positive electrode-side connector 23 is mounted on the upper end of the positive electrode-side cable 26, and the terminal 26a is located at the lower end of the positive electrode-side cable 26.

At the other side of the platform 35 in the left-right direction, a negative electrode-side cable 27 extends along the outer surface of the second plate portion 52 in the up-down direction. The negative electrode-side connector 24 is mounted on the upper end of the negative electrode-side cable 27, and a terminal 27a is located at the lower end of the negative electrode-side cable 27. The negative electrode electronic component-side bus bar 43 (electronic component-side bus bar; negative electrode-side circuit member) is mounted on the outer surface of the second plate portion 52. One end of the negative electrode electronic component-side bus bar 43 is connected to the terminal 27a of the negative electrode-side cable 27. The other end of the negative electrode electronic component-side bus bar 43 is electrically connected to one end of the negative electrode battery-side bus bar 46 via the second bolt B2 and the conductive collar 44 which are described later. The other end of the negative electrode battery-side bus bar 46 is electrically connected to the negative electrode side of the battery cell group 33.

The relay device 37, the fuse device 38, the first to third positive electrode electronic component-side bus bars 40 to 42, the negative electrode electronic component-side bus bar 43, and the terminals 26a and 27a are secured to the second plate portion 52 by the first bolts B1 made of metal. The terminal 27a of the negative electrode-side cable 27 and the negative electrode battery-side bus bar 46 (negative electrode member) are located close to the terminal 38c of the fuse device 38 and the first positive electrode electronic component-side bus bar 40 (positive electrode member), and are adjacent to each other.

Referring to FIGS. 3, 4, 6, and 7, the second plate portion 52 is a one-piece molded body made of an insulating resin. The second plate portion 52 is provided with a plurality of first nuts N1 formed by insert molding, and the first nuts N1 are located in correspondence with the first bolts B1. The second plate portion 52 includes a partition portion 52b projecting from a predetermined location on the outer surface 52a (major surface). The partition portion 52b is in the form of a plate. Since the second plate portion 52 is made of an insulating resin, the outer surface 52a and the partition portion 52b have insulating properties.

The partition portion 52b extends so as to pass through a gap between the positive electrode member constituted by the terminal 38c of the fuse device 38 and the first positive electrode electronic component-side bus bar 40 and the negative electrode member constituted by the terminal 27a of the negative electrode-side cable 27 and the negative electrode battery-side bus bar 46. That is, the partition portion 52b separates the positive and negative electrode members from each other. The length over which the partition portion 52b projects from the outer surface 52a of the second plate portion 52 is greater than the maximum lengths of the positive and negative electrode members from the outer surface 52a of the second plate portion 52.

At least an upper part of the partition portion 52b extends vertically. For example, the partition portion 52b extends vertically over a length corresponding to more than 70% (preferably more than 80%) of the distance between the upper and lower edges of the outer surface 52a of the second plate portion 52. The positive electrode member adjacent to one side of the partition portion 52b in the left-right direction and the negative electrode member adjacent to the other side of the partition portion 52b in the left-right direction each extend vertically over a length corresponding to more than 70% (preferably more than 80%) of the distance between the upper and lower edges of the outer surface 52a of the second plate portion 52. The partition portion 52b is provided with a first nut N1 formed by insert molding and facing laterally to allow one end of the negative electrode electronic component-side bus bar 43 and the terminal 27a of the negative electrode-side cable 27 to be secured laterally by a first bolt B1.

The second plate portion 52 is provided with an opening 52c located in correspondence with the relay device 37. The opening 52c as viewed in plan is generally rectangular. The second plate portion 52 includes a seat portion 52d located below the opening 52c and projecting from the outer surface 52a. The seat portion 52d faces the bottom surface of the housing 37a of the relay device 37 from below. The seat portion 52d has a three-dimensional structure including a rib structure and is thicker than the partition portion 52b. The seat portion 52d is provided with first nuts N1 formed by insert molding to allow the housing 37a of the relay device 37 to be secured by first bolts B1. The relay device 37 is placed on top of the seat portion 52d and secured to the seat portion 52d.

The internal unit 30 includes a damper 28 held between the holder 34 and the casing body 21. The distal ends (projecting ends) of the partition portion 52b and seat portion 52d of the second plate portion 52 are located close to the cover 22 with a gap G formed between the distal ends and the cover 22. The width of the gap G between the cover 22 and the partition portion 52b is smaller than the minimum thickness of the bolt B1.

Referring to FIGS. 7 and 8, the second plate portion 52 includes a frame portion 52e defining the opening 52c. The frame portion 52e includes facing portions 52ea facing the outer circumferential surface of the housing 37a of the relay device 37, and the facing portions 52ea are shaped to conform to the outer circumferential surface of the housing 37a. Specifically, the facing portions 52ea are each shaped to have an inclined surface such that the width W of the opening decreases in the direction from the outer surface 52a toward the inner surface 52f (toward the first plate portion 51). The relay device 37 is disposed in the opening 52c and protrudes in the direction from the outer surface 52a of the second plate portion 52 toward the first plate portion 51. Thus, the amount h by which the relay device 37 projects from the outer surface 52a of the second plate portion 52 is smaller than the outer diameter D of the relay device 37.

Referring back to FIGS. 3 and 5, the current sensor 39 disposed between the first plate portion 51 and the second plate portion 52 includes a housing 39a, and the housing 39a is provided with a detection hole 39b. The detection hole 39b opens toward both the first plate portion 51 and the second plate portion 52. The current sensor 39 is a non-contact sensor (e.g., a Hall effect sensor or a CT sensor), and detects a current flowing through a conductor extending through the detection hole 39b based on a magnetic force arising from the current.

The first plate portion 51 and the second plate portion 52 are respectively provided with insertion holes H1 and H2, which are aligned with the detection hole 39b of the current sensor 39. The negative electrode electronic component-side bus bar 43 is provided with an insertion hole H3 aligned with the insertion hole H2 of the second plate portion 52. The negative electrode battery-side bus bar 46 has an end portion 46a located between the first plate portion 51 and the holder 34, and the end portion 46a is provided with an insertion hole H4 aligned with the insertion hole H1 of the first plate portion 51. The holder 34 is provided with a second nut N2 formed by insert molding, and the hole of the second nut N2 is aligned with the insertion hole H4. That is, the insertion holes H1 to H4 and the hole of the second nut N2 are aligned with the detection hole 39b of the current sensor 39.

The conductive collar 44 is inserted through the detection hole 39b of the current sensor 39 and the insertion holes H1 and H2 of the first and second first plate portions 51 and 52. The insertion holes H3 and H4 are smaller in diameter than the insertion holes H1 and H2 and the detection hole 39b, and the conductive collar 44 is larger in diameter than the insertion holes H3 and H4. The conductive collar 44 is held between the negative electrode electronic component-side bus bar 43 and the negative electrode battery-side bus bar 46. The conductive collar 44 is a tubular body made of an electrically conductive material and may be, for example, a metal tube.

A second bolt B2 is inserted through the insertion holes H3 and H4 and the conductive collar 44. The second bolt B2 is threaded into the nut N2 of the holder 34. That is, the second bolt B2 fastens the negative electrode battery-side bus bar 46, first plate portion 51, second plate portion 52, and negative electrode electronic component-side bus bar 43 together, and the conductive collar 44 is in contact and electrical communication with the negative electrode battery-side bus bar 46 and the negative electrode electronic component-side bus bar 43.

In the configuration described above, the electric circuit between the positive electrode-side cable 26 and the negative electrode-side cable 27 includes the third positive electrode electronic component-side bus bar 42, relay device 37, second positive electrode electronic component-side bus bar 41, fuse device 38, first positive electrode electronic component-side bus bar 40, positive electrode battery-side bus bar 45, battery cell group 33, negative electrode battery-side bus bar 46, conductive collar 44 (second bolt B2), and negative electrode electronic component-side bus bar 43 which are arranged in series in this order.

In the configuration described above, where the electronic components such as the relay device 37 and fuse device 38 and the circuit members such as the bus bars 40 to 43 are closely arranged, the partition portion 52b of the platform 35 can, in the event of detachment and falling off of the first bolt B1 or second bolt B2, prevent the detached bolt from causing short-circuit between the positive electrode member (the terminal 38c of the fuse device 38 and the first positive electrode electronic component-side bus bar 40) and the negative electrode member (the terminal 27a of the negative electrode-side cable 27 and the negative electrode battery-side bus bar 46). Thus, while the battery pack 15 is constructed in a compact form, short-circuit between the positive electrode side and the negative electrode side on the platform 35 can be prevented without having to increase the number of required components.

Additionally, since the platform 35 has a two-story structure constructed of the first and second plate portions 51 and 52 spaced from each other and coupled by the pillar portions 53, the various electronic components (such as the BMS 36, relay device 37, fuse device 38, and current sensor 39) can be arranged in a compact fashion, and thus the size of the battery pack 15 can be reduced.

Additionally, since the current sensor 39 measures the current flowing through the conductive collar 44 (and the second bolt B2) which is (are) in contact and electrical communication with the negative electrode battery-side bus bar 46 and negative electrode electronic component-side bus bar 43, the current flowing between the negative electrode electronic component-side bus bar 43 and the negative electrode battery-side bus bar 46 can be measured. As such, the current sensor 39 can be arranged in a compact fashion.

Additionally, since the relay device 37 is disposed in the opening 52c of the second plate portion 52 and protrudes in the direction from the outer surface 52a of the second plate portion 52 toward the first plate portion 51, the amount h by which the relatively large relay device 37 projects from the outer surface 52a of the second plate portion 52 is reduced, and the size of the battery pack 15 can be reduced.

Additionally, since the facing portions 52ea of the frame portion 52e of the second plate portion 52 are each shaped to have an inclined surface such that the width of the opening of the second plate portion 52 decreases in the direction from the outer surface 52a toward the inner surface 52f (toward the first plate portion 51), an undesired increase in the width of the opening of the second plate portion 52 can be prevented while the amount h by which the relay device 37 projects from the outer surface 52a of the second plate portion 52 is reduced. As such, the thickness of the cover 22 (see FIG. 5) can be reduced. Further, in the event that the relay device 37 becomes unfixed, the relay device 37 can be received by the facing portions 52ea of the frame portion 52e of the second plate portion 52.

Additionally, since the relay device 37 is placed on that seat portion 52d of the second plate portion 52 which faces the bottom surface of the relay device 37, the relay device 37 can be stably supported by the seat portion 52d. Additionally, since the gap G is formed between the cover 22 and the distal ends of the partition portion 52b and seat portion 52d of the platform 35, the partition portion 52b or seat portion 52d can, when the damper 28 absorbs vibration, be prevented from interfering with the cover 22 and transmitting impact to the electronic components or other components. Additionally, since the second plate portion 52 includes the first nuts N1 formed by insert molding and the holder 34 includes the second nuts N2 formed by insert molding, the work of assembling the battery pack is easy, and the vibration resistance of the battery pack is high.

The present invention is not limited to the embodiment described above, and various changes, additions, or deletions can be made to the configuration of the above embodiment. For example, the vehicle is not limited to a motorcycle, and may be another type of vehicle (e.g., another type of straddle vehicle on which the rider rides in a straddling position, such as a motor tricycle). The vehicle need not be a hybrid vehicle, and may be an electric vehicle equipped with no internal combustion engine and running on drive power of an electric motor. The battery pack can be used not only as a power supply for an electric motor of a vehicle but also as a power supply for another device (such as a stationary device).

What is claimed is:

1. A battery pack comprising a casing and an internal unit accommodated in the casing, wherein
the internal unit comprises:
a battery cell group comprising a plurality of battery cells;
a holder holding the battery cell group; a platform connected to the holder;
a plurality of electronic components mounted on the platform;
a plurality of circuit members mounted on the platform; and
at least one fastener made of metal and securing at least one of the electronic components and the circuit members,
the electronic components comprise a positive electrode-side electronic component electrically connected to a positive electrode side of the battery cell group and a negative electrode-side electronic component electrically connected to a negative electrode side of the battery cell group,
the circuit members comprise a positive electrode-side circuit member electrically connected to the positive electrode side of the battery cell group and a negative electrode-side circuit member electrically connected to the negative electrode side of the battery cell group,
the platform comprises:
an insulating major surface on which a positive electrode member and a negative electrode member are disposed adjacent to each other, the positive electrode member including the positive electrode-side circuit member or a terminal of the positive electrode-side electronic component, the negative electrode member including the negative electrode-side circuit member or a terminal of the negative electrode-side electronic component;
an insulating partition portion projecting from the major surface and separating the positive electrode member and the negative electrode member from each other;
a first plate portion secured to the holder;
a second plate portion spaced from the first plate portion and positioned parallel to the first plate portion; and
a pillar portion securing the second plate portion to the first plate portion,
the electronic components comprise a first electronic component mounted on the first plate portion and a second electronic component mounted on the second plate portion,
the second electronic component comprises the positive electrode-side electronic component and the negative electrode-side electronic component, and
the battery pack further comprises:
a battery-side bus bar comprising an end portion disposed between the first plate portion and the holder, the battery-side bus bar being electrically connected to the battery cell group;
a current sensor disposed between the first plate portion and the second plate portion and comprising a detection hole; and
a conductive collar inserted through the detection hole of the current sensor, wherein
the at least one fastener comprises a bolt inserted through the conductive collar,
the positive electrode-side circuit member or the negative electrode-side circuit member comprises an electronic component-side bus bar disposed on the major surface of the second plate portion,
each of the first plate portion and the second plate portion comprises an insertion hole aligned with the detection hole of the current sensor,
each of the battery-side bus bar and the electronic component-side bus bar comprises an insertion hole aligned with the insertion holes of the first and second plate portions and the detection hole of the current sensor,
the conductive collar inserted through the detection hole is further inserted through the insertion holes of the first and second plate portions,
the bolt is inserted through the insertion holes to fasten the battery-side bus bar, the first plate portion, the second plate portion, and the electronic component-side bus bar together, and
the conductive collar is in contact with the battery-side bus bar and the electronic component-side bas bar.

2. A battery pack comprising:
a casing defining an internal space; and
an internal unit disposed in the internal space of the casing, wherein
the casing includes a casing body having an opening on one side, and a cover enclosing the opening of the casing body;
the internal unit comprises:
a battery cell group comprising a plurality of battery cells;
a holder holding the battery cell group;
a platform connected to the holder;
a positive electrode member and a negative electrode member mounted on the platform; and
a plurality of electronic components mounted on the platform, the platform comprises:
- an insulating major surface on which the positive electrode member and the negative electrode member are disposed adjacent to each other, wherein the positive electrode member is electrically connected to a positive electrode side of the battery cell group, and the negative electrode member is electrically connected to a negative electrode side of the battery cell group; and
- an insulating partition portion projecting from the major surface and separating the positive electrode member and the negative electrode member from each other,
at least one of the positive electrode member and the negative electrode member extends along the insulating major surface of the platform, and
a length over which the insulating partition portion projects from the insulating major surface is greater than a maximum length of the positive or negative electrode member from the insulating major surface,
wherein the positive electrode member and the negative electrode member are fixed to the platform by metal fasteners.

3. The battery pack according to claim 2, wherein
the platform comprises: a first plate portion secured to the holder; a second plate portion spaced from the first plate portion and positioned parallel to the first plate portion; and a pillar portion securing the second plate portion to the first plate portion,
the electronic components comprise a first electronic component mounted on the first plate portion and a second electronic component mounted on the second plate portion,
the second electronic component comprises a positive electrode-side electronic component and a negative electrode-side electronic component, and
the second plate portion comprises the major surface and the partition portion.

4. The battery pack according to claim 3, wherein
the second plate portion comprises an opening, and
the second electronic component comprises a relay device disposed in the opening of the second plate portion and protruding in a direction from the major surface toward the first plate portion.

5. The battery pack according to claim 4, wherein
the relay device comprises an outer circumferential surface,
the second plate portion comprises a frame portion defining the opening of the second plate portion, and
at least a part of the frame portion is shaped to conform to the outer circumferential surface so that a width of the opening of the second plate portion decreases in the direction from the major surface toward the first plate portion.

6. The battery pack according to claim 4, wherein
the second plate portion comprises a seat portion projecting from the major surface and facing a bottom surface of the relay device, and
the relay device is placed on the seat portion.

7. The battery pack according to claim 2, wherein
the platform comprises at least one metal nut formed by insert molding, and
the positive electrode member or the negative electrode member is threaded into the metal nut by a metal bolt.

8. The battery pack according to claim 2, wherein the electronic components comprise a positive electrode-side electronic component electrically connected to the positive electrode side of the battery cell group and a negative electrode-side electronic component electrically connected to the negative electrode side of the battery cell group.

9. The battery pack according to claim 2, wherein the electronic components include at least one selected from the group consisting of a relay device, a fuse device, and a current sensor.

10. The battery pack according to claim 2, wherein
the positive electrode member includes a positive electrode-side cable including a first terminal,
the negative electrode member includes a negative electrode-side cable including a second terminal, and
the electronic components are located between the first terminal of the positive electrode-side cable and the second terminal of the negative electrode-side cable.

11. The battery pack according to claim 2, wherein
the internal unit further comprises circuit members, and a fastener made of metal and securing the circuit members to the platform, and
with the fastener securing the circuit members to the platform together, the circuit members are in electronic communication with each other.

12. The battery pack according to claim 2, wherein
the partition portion extends over a length corresponding to more than 70% of a distance between one edge of the major surface and the other edge of the major surface in a predetermined direction, and
the positive electrode member and the negative electrode member extend over a length corresponding to more than 70% of the distance between the one edge of the major surface and the other edge of the major surface in the predetermined direction.

13. The battery pack according to claim 2, wherein
the opening of the casing body is at a side of the battery cell group; and
the positive electrode-side electronic component and the negative electrode-side electronic component are at the side of the battery cell group.

14. The battery pack according to claim 2, wherein the positive electrode-side electronic component and the negative electrode-side electronic component are between the cover and the battery cell group.

15. The battery pack according to claim 2, wherein
the cover has a recess; and
the positive electrode-side electronic component and the negative electrode-side electronic component are between the opening of the casing body and the cover.

16. The battery pack according to claim 2, wherein the at least one of the positive electrode member and the negative electrode member includes a bus bar.

17. The battery pack according to claim 2, wherein the insulating major surface of the platform extends in a vertical direction.

18. The battery pack according to claim 2, further comprising:
- a positive electrode-side connector exposed outside of the casing; and
- a negative electrode-side connector exposed outside of the casing, wherein
- the positive electrode member is electrically coupled to the positive electrode-side connector, and
- the negative electrode member is electrically coupled to the negative electrode-side connector.

* * * * *